Aug. 13, 1940.   C. E. JOHNSON   2,211,503
VARIABLE SPEED TRANSMISSION FOR MOTORS
Filed June 27, 1933
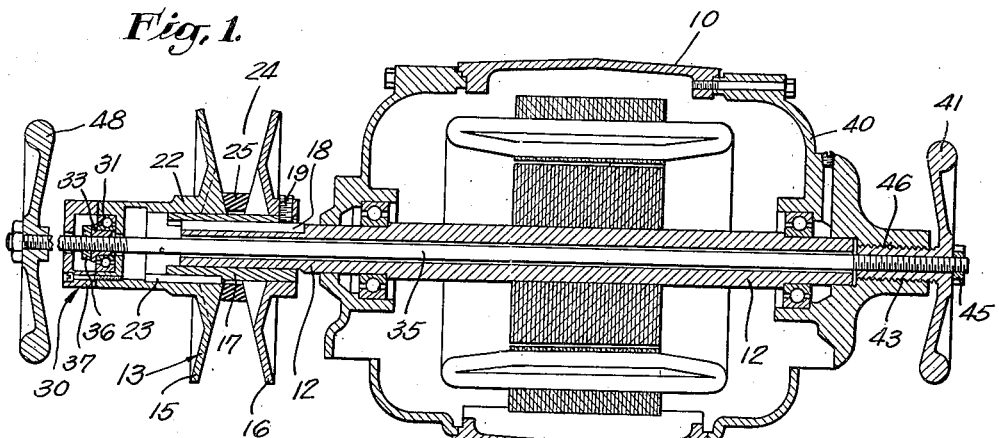
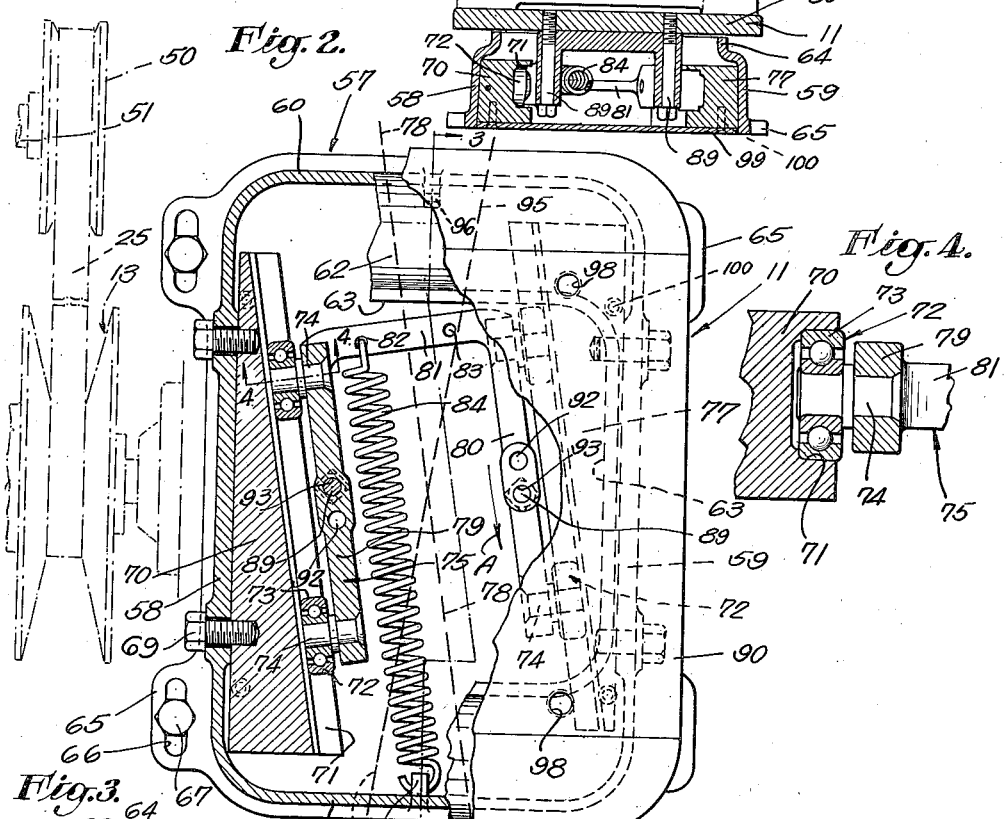
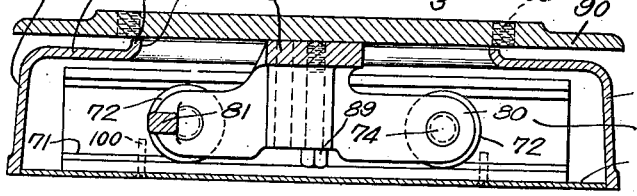
INVENTOR
CARL E. JOHNSON.
ATTORNEY.

Patented Aug. 13, 1940

2,211,503

UNITED STATES PATENT OFFICE 2,211,503

VARIABLE SPEED TRANSMISSION FOR MOTORS

Carl E. Johnson, Pasadena, Calif., assignor to Sterling Electric Motors, Inc., Los Angeles, Calif., a corporation of California Application June 27, 1933, Serial No. 677,862

13 Claims. (Cl. 74—230.17)

My invention relates to variable speed devices and more particularly to a combination including an electric motor and a variable speed device.

It is often desirable to connect a drive shaft and a driven shaft by the use of a variable speed transmission means. One mode of changing the speed ratios between such shafts is to provide a pulley means on one of the shafts, this pulley means being of the adjustable V-type. Such a pulley means includes a pair of frusto-conical flange members movable toward and away from each other, and in conventional practice a spring is used for moving these members toward each other. It is an object of the present invention to dispense with such a spring actuated pulley means, and to provide an adjustment means which mechanically interconnects the flange members.

It is a further object of the invention to provide a system as set forth above in which the driven shaft is fixed in axial position and in which the drive shaft itself can be changed in axial position as the flange members are moved with respect to each other to effectively change the diameter of the pulley means, thus changing the speed of the driven shaft.

Still a further object of the invention is to provide a motor including the drive shaft and supported on a slidable base member which can be mechanically or resiliently moved in a direction tending to tighten the belt. This combination is especially valuable when the adjustment means herein disclosed is utilized. This combination wherein the motor is mounted on a slidable base member has been found to be very advantageous even with loads wherein sudden changes in torque are experienced, for this structure appears to eliminate any tendency of the belt to move downward in the pulley means with increase in torque and appears to give a more stable operation than does a combination in which the motor is pivotally mounted.

Further objects of the invention lie in the provision of a novel base structure associated with a slidable base member. The base structure shown in the instant application is adaptable to a variety of installations, and it is a particular feature to provide a base structure which can be used regardless of the direction in which the belt and shaft extend.

Further objects and advantages of the invention will be evident hereinafter.

Referring to the drawing:

Fig. 1 is a vertical sectional view of one form of the invention.

Fig. 2 is a top view of the base of my invention, partially broken away.

Fig. 3 is a sectional view taken on the line 3—3 of Fig. 2.

Referring particularly to Fig. 1, I have shown a motor 10 mounted on a slidable base 11 and carrying a hollow drive shaft 12 to which a pulley means 13 of the adjustable V-type is attached. This pulley means includes flange members 15 and 16, the former being fixed to a sleeve 17 suitably keyed to the hollow shaft 12 as by a key 18. In the preferred embodiment no axial movement between the flange member 16 and the hollow shaft 12 takes place, this being prevented by any means such as a set screw 19 engaging the key 18 in clamping relationship.

The flange member 15 is carried by a sleeve 22 which is slidable relative to the sleeve 17, rotation therebetween being prevented by a key or equivalent means 23. These flange members cooperate in forming a V-shaped channel 24 in which a V-belt 25 is positioned. The distance between these flange members controls the effective diameter of the pulley means.

The distance between the flange members 15 and 16 is controlled by an adjustment means 30. In the form shown, this adjustment means includes a thrust-bearing 31, the outer race of which is retained in the sleeves 22, the inner race retaining a nut 33. Any suitable means is provided for securing this nut to a control member 35 extending through the hollow shaft 12. As shown, the end of this control member is threaded into the nut 33, a lock nut 36 being also threaded to the control member and engaging the nut 33 to prevent relative movement between the control member 35 and the nut 33. A cover structure 37 may be secured to the end of the sleeve 22 to enclose the bearing 31.

The control member 35 extends completely through the motor and through an end bell 40 thereof. The outer end of this control member carries a hand wheel or other actuating device 41 suitably secured thereto. It is preferable to provide an adjusting means between this actuating member and the control member 35. This may be done by threading the end of the control member with respect to a sleeve 43 carried by the actuating member 41. A lock nut 45 acts to normally prevent any relative movement between the actuating member 41 and the control member 35, so that these members normally turn as a unit. However, by loosening the lock nut it becomes possible to change the relative positions of the members 35 and 41.

The sleeve 43 is externally threaded and extends into a threaded bore 46 of the end bell 40. Thus, as the actuating member 41 is turned the sleeve 43 is advanced and retracted with respect to this bore, thus moving the control member 35 and thereby operating the adjustment means 30 to move the flange member 15 relative to the flange member 16. Due to the use of the bearing 31, this can be done regardless of the operation of the motor. It should not be understood, however, that such adjustment can be effected only at that end of the motor opposite the pulley means 13. Thus, it is sometimes desirable to dispense with the actuating member 41 and extend the control member 35 through the cover structure 37 to receive an actuating member 48. Such a structure permits speed adjustment from the pulley end of the motor. In other installations it may be desirable to use both the actuating members 41 and 48, as shown in Fig. 1.

As indicated by dotted lines in Fig. 2, the belt 25 may extend around a driven pulley 50 carried by a suitably journalled driven shaft 51. In the form shown, this driven shaft is fixed in axial position, and the pulley 50 is of the V-type, being non-adjustable. It should be understood, however, that in certain instances it is possible to utilize other types of pulleys 50 either of the adjustable or non-adjustable type.

With the form shown, the belt means 25 follows the flange member 16 as the effective diameter of the pulley means is being decreased. Thus, the central axis of this belt means moves axially with respect to the drive shaft 12 a slight distance. It is thus desirable to move the entire pulley means 13 a corresponding distance in an opposite axial direction to compensate for the shift in the position of the belt, the object in view of course being to allow the axis of the belt to lie in a fixed plane at right angles to the axis of rotation of the drive shaft 12, regardless of the setting of the pulley means. In the form shown, this change in position of the pulley means is accomplished by the use of the slidable base 11, as will be hereinafter described.

So also, it will be clear that as the belt means 25 is of constant length some relative movement between the axes of the drive and driven shafts must take place in order to maintain the tension of the belt means constant. This also is provided for by the slidable base 11.

The details of this base 11 are best shown in Figs. 2, 3 and 4. Referring thereto, the base includes a base structure 57 which is of hollow construction, being preferably formed with side walls 58 and 59 and end walls 60 and 61. These walls are joined to an upper wall 62 providing an opening 63 therein and defined by a flange 64 extending upward around this opening. In the preferred embodiment this base structure is cast as an integral member, and includes lugs 65 providing elongated openings 66 adapted to receive studs 67 for adjustably clamping the base structure in position.

Detachably connected to the side wall 58 as by cap screws 69 is a track element 70 forming a part of a track means for slidably mounting the motor. It is desirable that this track means extend at an acute angle relative to the side wall 58 so that as the motor moves in a direction determined by the track means this motor and the attached pulley means 13 will be shifted sideways a distance sufficient to maintain the axis of the belt means 25 in a fixed plane as the pulley means 13 changes its effective diameter. The angle between the track means and the wall 58 for instance will thus be determined by the angle between the flange member 16 and a plane at right angles to the axis of rotation of the pulley means.

The track element 70 provides a groove 71 in the inner edge thereof and along which suitable wheels 72 roll. These wheels are preferably of a diameter only slightly less than the distance across the groove 71. In the preferred embodiment these wheels comprise the outer race of a ball bearing 73, the inner race being respectively secured to stub shafts 74 secured to a carriage 75.

A similar track element 77 is detachably connected to the side wall 59 and carries a similar groove along which the carriage wheels move. The track elements 70 and 77 cooperate in defining a track means to guide the carriage along a line indicated by the numeral 78.

The carriage 75 comprises a U-shaped member with legs 79 and 80 joined by a cross member 81, each of these legs carrying a pair of the stub shafts 74, each stub shaft being associated with a wheel means, as shown. This cross member provides openings 82 and 83, and a tension spring 84 extends between the opening 82 and a lug 85 carried by the end wall 61 to force the carriage in the direction indicated by the arrow A of Fig. 2.

This carriage 75 also includes a head member 88 extending between the legs 79 and 80. Holes are drilled through each leg and through the head member, cap screws 89 extending therethrough and being threaded into a base member 90 which covers the opening 63 and extends a distance therebeyond. As best shown in Figs. 1 and 2, these holes are disposed in pairs, one pair of openings being indicated by the numeral 92 and the other pair being indicated by the numeral 93. The holes are so positioned that a line connecting the centers of the openings 93 is preferably at right angles to the side walls 58 and 59, while the angle between such a line and a line connecting the centers of the openings 92 is double the angle between the line 78 (representing the direction of the track means) and the side walls 58 and 59.

In the form of base structure shown in Fig. 2 the carriage is resiliently forced in the direction of the arrow A, so that the belt means of the motor extends in the opposite direction. If it is desired to reverse the direction in which the belt means etxends, or if the pulley means is to be placed on the other end of the motor shaft, it is necessary to change the direction of the track means with respect to the base. This may be easily accomplished by removing the cap screws 69 and reversing the position of each track element so that the track means will then extend parallel to an axis indicated by the numeral 95. The carriage 75 can be turned in a horizontal plane, and the spring 84 connected to a lug 96 of the end wall 60. In this instance the cap screws 89 can be extended through the pair of openings 92 so that the base member remains in correct position with reference to the base structure 57. This structure is thus a universal one, permitting adaption of the base means to various installations.

The motor preferably rests directly on the slidable base member 90, holes 98 being provided for this purpose, these holes being positioned to receive a standard-base of an electric motor. So also, it is usually desirable to close the lower end of the base structure 57 by a plate 99 which may be conveniently secured to the track elements 70 and 77 through screws 100.

In the operation of the device, the entire motor and pulley means 13 is mounted on a slidable base member and is thus resiliently forced in a direction tending to tighten the belt. As the adjustment means 30 is moved through the medium of the actuating means 41, the effective diameter of the pulley means is changed and the spring actuated base automatically compensates for this action, both in allowing the axis of the motor shaft to be moved sideways and in permitting the motor to move at the proper angle so that the center line of the belt means is maintained in a single plane.

While I have disclosed the pulley means in conjunction with an electric motor and while this combination is particularly valuable, it should be understood that I am not limited thereto in all instances. Furthermore, while the slidable base 11 finds particular utility in conjunction with a motor directly connected thereto it should be understood that this base is novel regardless of the attachment of the motor. This base might for instance carry a suitable bearing means for journalling the shaft, or might be useful in other capacities.

I claim as my invention:

1. In combination: a slidable base member; a motor movable with said slidable base member; a hollow shaft on said motor; a pulley means of the adjustable V-type on one end of said shaft and including two flange members, one of said flange members being movable toward and away from the other; adjustment means for moving said movable flange member, said adjustment means including a control member extending through said hollow shaft of said motor; control means at the other end of said shaft from said pulley means for moving said control member; a driven pulley; and a belt means operatively connecting said driven pulley and said pulley means, said belt means being of constant length whereby movement of said motor is effected as said control means is moved to change the effective diameter of said pulley means.

2. In combination: a slidable base member; a motor movable with said slidable base member; a hollow shaft on said motor; a pulley means of the adjustable V-type on one end of said shaft and including two flange members, one of said flange members being movable toward and away from the other; adjustment means for moving said movable flange member toward and away from the other, said adjustment means including a control member extending through said hollow shaft of said motor; control means at the other end of said shaft from said pulley means for moving said control member; resilient means acting to force said slidable base member in one direction; a driven pulley; and a belt means operatively connecting said driven pulley and said pulley means, said belt means being of substantially constant length whereby said resilient means moves said motor as said control means is moved to change the effective diameter of said pulley means.

3. In combination: a slidable base member; resilient means acting to force said base member in one direction; a hollow shaft journalled on said slidable base member; a pulley means of the adjustable V-type on one end of said shaft and including two flange members, one of said flange members being movable toward and away from the other; adjustment means for moving said movable flange member toward and away from the other, said adjustment means including a control member extending through said hollow shaft and journalled with respect to said hollow shaft; control means at the other end of said shaft from said pulley means for moving said control member; an auxiliary pulley; and a belt means operatively connecting said auxiliary pulley and said pulley means, said belt means being of substantially constant length whereby said resilient means moves said slidable base member as said control means is moved to change the effective diameter of said pulley means.

4. In combination: a hollow base structure; a pair of track elements secured inside said base structure on opposite sides thereof and comprising a track means; a carriage movable along said track means; a base member movable with said carriage; an electric motor for journalling a drive shaft on said base member so that said drive shaft moves with said base member and in a direction determined by said track means; a pulley means on said drive shaft of the adjustable V-type including a pair of flange members, one of said flange members being movable toward and away from the other; a driven pulley; belt means operatively connecting said driven pulley and said pulley means; and resilient means for moving said carriage as said flange member is moved.

5. A combination as defined in claim 4 in which said track elements are wider at one end than at the other to angle said track means with respect to said base structure.

6. A combination as defined in claim 4 in which said track elements are wider at one end than at the other to angle said track means with respect to said base structure, and in which said track elements are reversible in position to cause said track means to assume a different angular position with respect to said base structure.

7. In a system of the character described, a fixed diameter pulley, a variable diameter pulley structure, said structure having a pair of sections with opposed inclined faces, a shaft to which one of the sections is axially fixed, said shaft being hollow, an axially adjustable rod extending into the shaft and connected to the other section, a flexible belt between the pulley and the structure, a support for the pulley structure, said support forming a guide for movement of the pulley structure in a direction to vary the center distance between the fixed diameter pulley and the variable diameter structure, as well as in a direction to keep the belt in substantial alinement, and resilient means for adjusting the center distance between the axes of said pulleys in accordance with the adjustment of said variable diameter pulley.

8. In a system of the character described, a fixed diameter driven pulley, a motor having a shaft, a variable diameter driving pulley structure on the shaft, said structure having a pair of sections with opposed inclined faces, one of said sections being axially fixed to the shaft, said shaft being hollow, an axially adjustable rod extending into the shaft and connected to the other section, a guide for the motor for movement in a direction to vary the center distance between the driven pulley and the driving pulley structure, as well as in a direction to keep the belt in substantial alignment, and resilient means for adjusting the center distance between the axes of said pulleys in response to the adjustment of said variable diameter pulley.

9. In combination: a movable base member; a shaft journalled on said base member; a supporting member adapted to support said base member, said supporting member having guide means for guiding the movement of said base member in a flat plane in a predetermined direction angularly disposed relative to the axis of said shaft; a variable-diameter pulley of the V-type mounted on said shaft and having a pair of flanges, one of said flanges being axially movable toward and away from the other to adjust the effective diameter of said pulley; adjustment means for axially moving said one flange relative to the other; and resilient means connected to said base member for resiliently resisting movement of said base member in said direction on said supporting member.

10. In combination: a movable base member; a shaft journalled on said base member; a supporting member adapted to support said base member, said supporting member having guide means for guiding the movement of said base member in a flat plane in a predetermined direction angularly disposed relative to the axis of said shaft; means for varying the angularity of said guide means so as to change the direction of movement of said base member; a variable-diameter pulley of the V-type mounted on said shaft and having a pair of flanges, one of said flanges being axially movable toward and away from the other to adjust the effective diameter of said pulley; adjustment means for axially moving said one flange relative to the other; and resilient means connected to said base member for resiliently resisting movement of said base member in said direction on said supporting member.

11. In combination: a movable base member; a motor on said base member having a drive shaft; a supporting member adapted to support said base member, said supporting member having guide means for guiding the movement of said base member in a flat plane in a predetermined direction angularly disposed relative to the axis of said shaft; a variable-diameter pulley of the V-type mounted on said shaft and having a pair of flanges, one of said flanges being axially movable toward and away from the other to adjust the effective diameter of said pulley; adjustment means for axially moving said one flange relative to the other; and resilient means connected to said base member for resiliently resisting movement of said base member in said direction on said supporting member.

12. In combination: a movable base member; a motor on said base member having a hollow drive shaft; a supporting member adapted to support said base member, said supporting member having guide means for guiding the movement of said base member in a flat plane in a predetermined direction angularly disposed relative to the axis of said shaft; a variable-diameter pulley of the V-type mounted on said shaft and having a pair of flanges, one of said flanges being axially movable toward and away from the other to adjust the effective diameter of said pulley; adjustment means for axially moving said one flange relative to the other, including an axially adjustable rod extending into said shaft and operatively connected to said one flange; and resilient means connected to said base member for resiliently resisting movement of said base member in said direction on said supporting member.

13. In combination: a movable base member; a motor on said base member having a hollow drive shaft; a supporting member adapted to support said base member, said supporting member having guide means for guiding the movement of said base member in a flat plane in a predetermined direction angularly disposed relative to the axis of said shaft; a variable-diameter pulley of the V-type mounted on said shaft at one side of said motor and having a pair of flanges, one of said flanges being axially movable toward and away from the other to adjust the effective diameter of said pulley; adjustment means at the other side of said motor for axially moving said one flange relative to the other, including an axially adjustable rod extending through said shaft and said motor and operatively connected to said one flange; and resilient means connected to said base member for resiliently resisting movement of said base member in said direction on said supporting member.

CARL E. JOHNSON.